(12) United States Patent
Jimbo

(10) Patent No.: US 12,718,349 B2
(45) Date of Patent: Aug. 25, 2026

(54) EVALUATION APPARATUS, INFORMATION PROCESSING APPARATUS, COMPUTER-READABLE STORAGE MEDIUM, FILM FORMING SYSTEM, AND ARTICLE MANUFACTURING METHOD

(71) Applicant: CANON KABUSHIKI KAISHA, Tokyo (JP)

(72) Inventor: Satoru Jimbo, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 422 days.

(21) Appl. No.: 18/339,314

(22) Filed: Jun. 22, 2023

(65) Prior Publication Data

US 2023/0419474 A1 Dec. 28, 2023

(30) Foreign Application Priority Data

Jun. 27, 2022 (JP) ................................ 2022-102867

(51) Int. Cl.
*G06K 9/00* (2022.01)
*G06T 7/00* (2017.01)
(Continued)

(52) U.S. Cl.
CPC ............. *G06T 7/0008* (2013.01); *G06T 7/13* (2017.01); *G06T 7/50* (2017.01); *G06T 7/60* (2013.01);
(Continued)

(58) Field of Classification Search
CPC .......... G06T 7/0008; G06T 7/13; G06T 7/50; G06T 7/60; G06T 2207/20081;
(Continued)

(56) References Cited

U.S. PATENT DOCUMENTS

2019/0147127 A1 5/2019 Su et al.
2020/0264513 A1* 8/2020 Yamamoto ............. G03F 7/705
(Continued)

FOREIGN PATENT DOCUMENTS

JP 2004193500 A * 7/2004
JP 2019080047 A 5/2019
(Continued)

OTHER PUBLICATIONS

Imprint lithography for integrated circuit fabrication, D. J. Resnick, et al., AVS, 2003, pp. 2624-2631 (Year: 2003).*
(Continued)

*Primary Examiner* — Jayesh A Patel
(74) *Attorney, Agent, or Firm* — ROSSI, KIMMS & McDOWELL LLP

(57) ABSTRACT

An evaluation apparatus includes an obtaining unit configured to obtain an image of an evaluation region including a film forming region on which a film is formed by a film forming process, and a processor configured to process the image for the evaluation. The processor is configured to output a feature concerning an abnormality in the image in accordance with a learned model. The image and design information representing a geometrical feature of the film forming region are input to the learned model.

16 Claims, 14 Drawing Sheets

(51) Int. Cl.

| | |
|---|---|
| ***G06T 7/13*** | (2017.01) |
| ***G06T 7/50*** | (2017.01) |
| ***G06T 7/60*** | (2017.01) |
| ***G06V 10/44*** | (2022.01) |

(52) U.S. Cl.
CPC .......... *G06V 10/44* (2022.01); *G06V 2201/07* (2022.01)

(58) Field of Classification Search
CPC . G06T 2207/20084; G06T 2207/30108; G06T 7/0004; G06V 10/44; G06V 2201/07
See application file for complete search history.

(56) References Cited

U.S. PATENT DOCUMENTS

| | | | | |
|---|---|---|---|---|
| 2021/0097675 | A1* | 4/2021 | Koga | G06T 7/0004 |
| 2022/0019180 | A1* | 1/2022 | Samejima | G05B 13/0265 |
| 2022/0067958 | A1 | 3/2022 | Jimbo et al. | |
| 2024/0161271 | A1* | 5/2024 | Okazaki | G06V 10/25 |

FOREIGN PATENT DOCUMENTS

| | | | | |
|---|---|---|---|---|
| JP | 2022175498 | A * | 11/2022 | H10W 46/00 |
| JP | 2022183892 | A * | 12/2022 | H10P 95/60 |
| KR | 1020210013600 | A | 2/2021 | |
| KR | 1020210018095 | A | 2/2021 | |
| TW | 202208996 | A | 3/2022 | |

OTHER PUBLICATIONS

Office Action issued in Korean Appln. No. 10-2023-0080129 mailed on Sep. 19, 2025.

Office action issued in Taiwanese Appln. No. 112123171 dated Oct. 3, 2025.

Office Action issued in Chinese Appln. No. 202310763599.3 mailed on May 26, 2026.

* cited by examiner 100
110
103
151
107
108
112
111
125
106
123
130
122
121
M
S
IM
CS
MP
105
102
104
140
150
Z
Y
X

CAPTURED IMAGE
DESIGN INFORMATION
MACHINE LEARNING MODEL
REGION OF DETECTED ABNORMALITY

CAPTURED IMAGE
DESIGN INFORMATION
MACHINE LEARNING MODEL
REGION OF DETECTED ABNORMALITY

FIG. 12

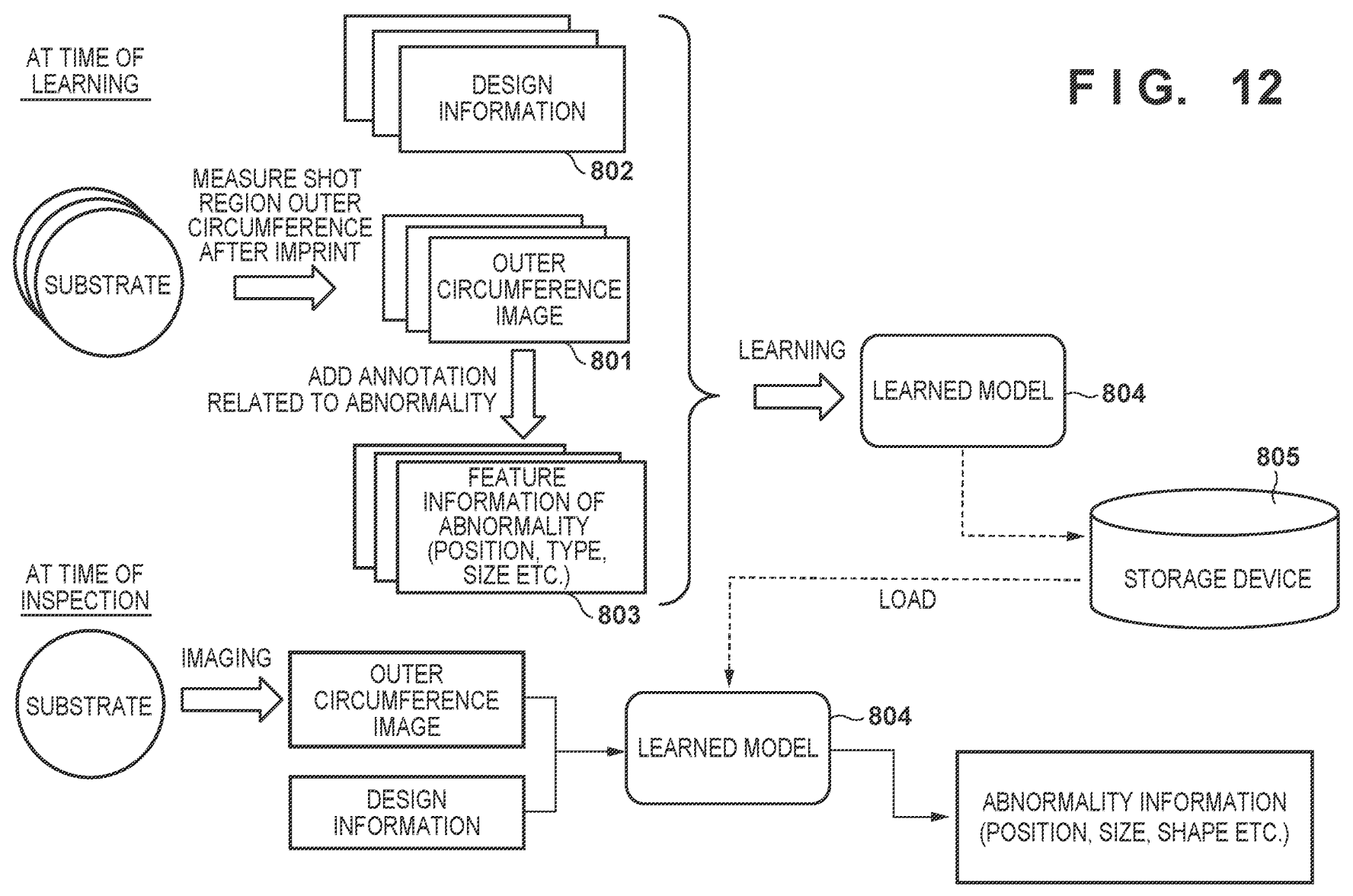

AT TIME OF LEARNING

SUBSTRATE

MEASURE SHOT REGION OUTER CIRCUMFERENCE AFTER IMPRINT

DESIGN INFORMATION

802

OUTER CIRCUMFERENCE IMAGE

801

ADD ANNOTATION RELATED TO ABNORMALITY

FEATURE INFORMATION OF ABNORMALITY (POSITION, TYPE, SIZE ETC.)

803

LEARNING

LEARNED MODEL

804

805

STORAGE DEVICE

LOAD

AT TIME OF INSPECTION

SUBSTRATE

IMAGING

OUTER CIRCUMFERENCE IMAGE

DESIGN INFORMATION

LEARNED MODEL

804

ABNORMALITY INFORMATION (POSITION, SIZE, SHAPE ETC.)

FIG. 14

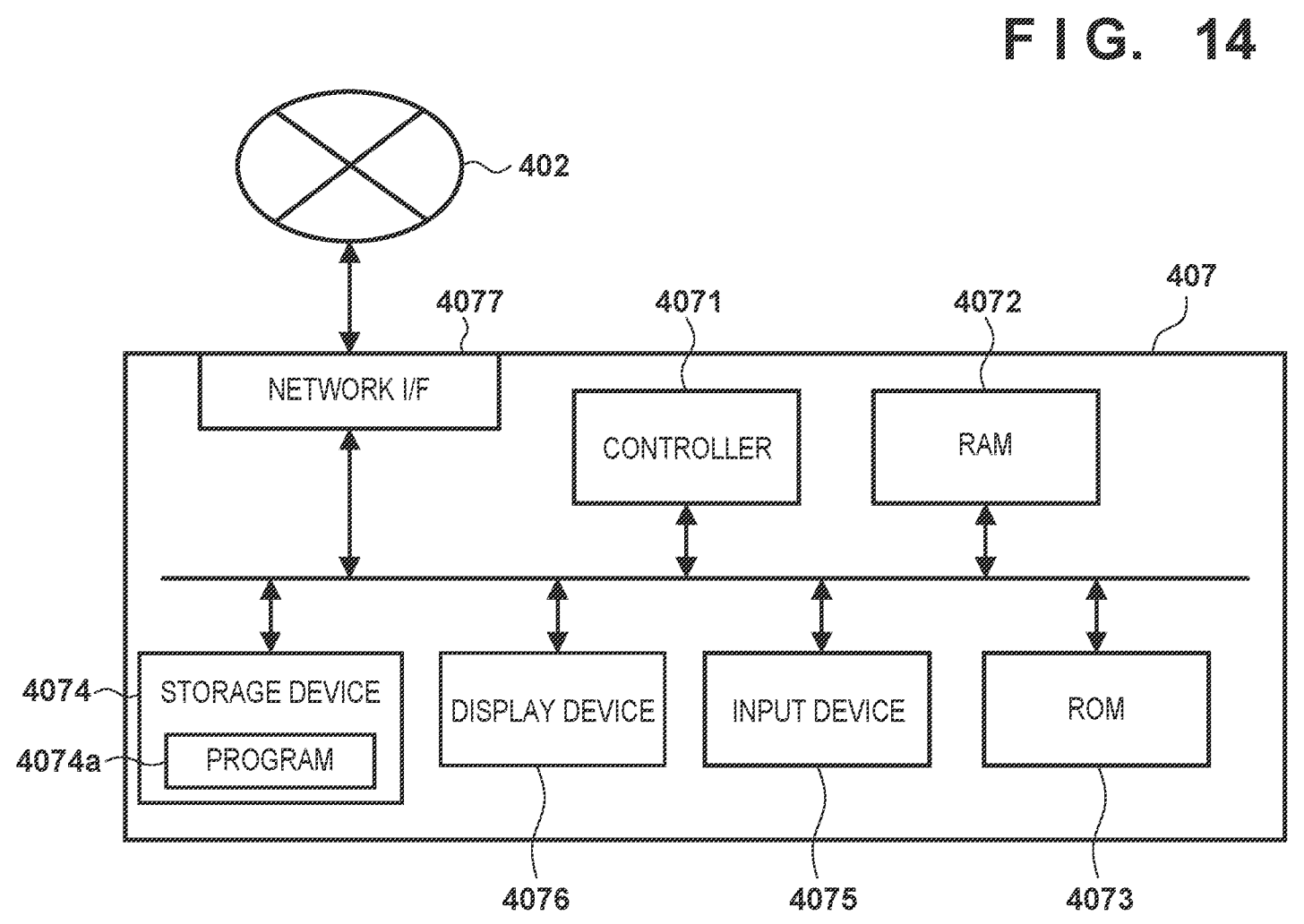

407
402
4077 NETWORK I/F
4071 CONTROLLER
4072 RAM
4073 ROM
4075 INPUT DEVICE
4076 DISPLAY DEVICE
4074 STORAGE DEVICE
4074a PROGRAM

EVALUATION APPARATUS, INFORMATION PROCESSING APPARATUS, COMPUTER-READABLE STORAGE MEDIUM, FILM FORMING SYSTEM, AND ARTICLE MANUFACTURING METHOD

BACKGROUND OF THE INVENTION

Field of the Invention

The present invention relates to an evaluation apparatus, an information processing apparatus, a computer-readable storage medium, a film forming system, and an article manufacturing method.

Description of the Related Art

Imprint techniques that are techniques of forming a fine pattern are being put into practical use. One of the imprint techniques is a photo-curing method. In an imprint apparatus employing the photo-curing method, in a state in which an original (mold) is in direct contact with a photo-curable formable material (imprint material) supplied onto a substrate, light irradiation is performed to cure the imprint material. After that, the mold is separated from the cured imprint material, thereby forming a pattern on the substrate. For example, to manufacture a semiconductor device or the like, an apparatus to which step and flash imprint lithography is applied is effective (Japanese Patent Laid-Open No. 2019-80047).

When forming a pattern on a substrate using the imprint technique that is one of film forming techniques, an imprint material may protrude outward from the pattern region because the supply amount of the imprint material is too large. On the other hand, there is a case where the imprint material is not spread out due to a small supply amount of the imprint material, and a pattern cannot partially be formed (unfilling). If extrusion occurs, the portion of the extrusion causes a pattern formation failure, and additionally, the pattern of the mold that comes into contact with that portion is broken. Also, if unfilling occurs, no pattern is formed on that portion, and therefore, a defective semiconductor device is formed.

Hence, it is necessary to detect the presence/absence of extrusion or unfilling after the imprint process and adjust the supply amount and position of the imprint material in accordance with the result of the detection to prevent a failure. However, since extrusion or unfilling occurs in a very small region, an enormous number of observation images obtained by a high magnification microscope with a small detection range need to be confirmed, and it is difficult to manually perform this. Hence, there is a demand for a technique of inspecting extrusion or unfilling from an observation image and determining a pattern formation failure caused by extrusion or unfilling without intervention of manpower. The pattern formation failure caused by extrusion or unfilling will sometimes be referred to as an "abnormality" hereinafter.

This abnormality appears in different manners depending on imprint conditions. To adjust the imprint conditions including the imprint material supply amount, not only the presence/absence of an abnormality but also information such as the position and the shape of the abnormality needs to be detected in detail.

SUMMARY OF THE INVENTION

The present invention provides a technique advantageous in obtaining, in detail, the position and the shape of an abnormality of a composition on a substrate, which is obtained by a film forming process.

The present invention in its one aspect provides an evaluation apparatus configured to perform, concerning a substrate that has undergone a film forming process of forming a film of a composition on a film forming region of the substrate using a mold, evaluation of the film, the apparatus including an obtaining unit configured to obtain an image of an evaluation region including the film forming region on which the film is formed by the film forming process, and a processor configured to process the image for the evaluation, wherein the processor is configured to output a feature concerning an abnormality in the image in accordance with a learned model, and the image and design information representing a geometrical feature of the film forming region are input to the learned model.

Further features of the present invention will become apparent from the following description of exemplary embodiments (with reference to the attached drawings).

BRIEF DESCRIPTION OF THE DRAWINGS

FIG. 4 is a flowchart showing the operation of the imprint apparatus;

FIG. 12 is a schematic view of a method to be executed at the time of learning and inspection;

FIG. 14 is a view showing the configuration of an evaluation apparatus; and

DESCRIPTION OF THE EMBODIMENTS

Figures 1A, 1B:
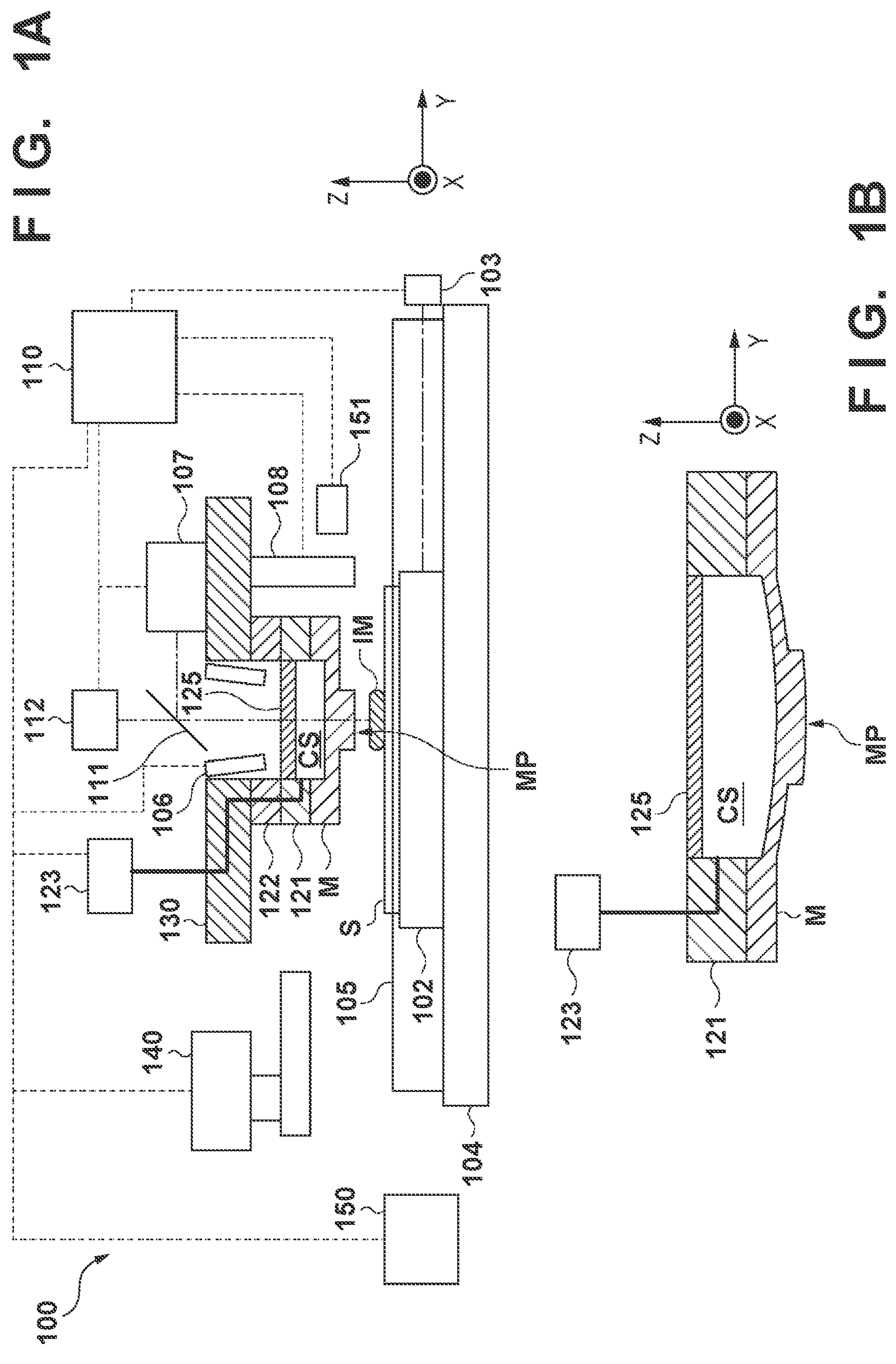
FIGS. 1A and 1B are views showing the configuration of an imprint apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

An embodiment described below is related to a film forming system including a film forming apparatus. The film forming apparatus is used to manufacture devices such as semiconductor devices as articles, places an uncured composition (formable material) on a substrate, and forms the placed composition with a mold to form a film of the composition on the substrate. The film forming apparatus may be referred to as a forming apparatus, and similarly, a film forming process may be referred to as a forming process.

The film forming processing includes a contact step of bringing the formable material supplied onto the substrate into contact with the mold (original or template). With this contact, the formable material is formed. The forming processing can further include a curing step of curing the formable material in a state in which the formable material and the mold are in contact with each other. With this step, a composition made of a cured product of the formable material is formed on the substrate. The film forming processing can further include a separation step of separating the composition made of the cured product of the formable material from the mold.

The film forming apparatus can be used as an imprint apparatus that transfers a pattern of a mold to an imprint material by bringing the imprint material as a formable material supplied onto a shot region on a substrate where the pattern is to be formed into contact with a pattern portion of the mold. The pattern can be, for example, a pattern (device pattern) of a semiconductor device. In the imprint apparatus, the imprint process can be performed for each of a plurality of shot regions formed on a substrate. Alternatively, it is also possible to configure the imprint apparatus to perform the imprint process (that is, contact) collectively for multiple shot regions (for the entire surface of the substrate or for the shot regions in one, two, or more rows) of the substrate.

Alternatively, the film forming apparatus can be used as a planarizing apparatus that performs a planarizing process for bringing a formable material on a substrate with a member including a flat surface (a flat surface of a mold), thereby forming a planarized film made of the formable material.

Hereinafter, in order to show a specific example, a system including the imprint apparatus as one example of the forming apparatus will be described. FIG. 1A schematically shows the arrangement of an imprint apparatus IMP according to an embodiment. The imprint apparatus IMP performs an imprint process in which an imprint material IM is cured in a state in which the imprint material IM on a substrate S is in contact with a pattern region MP of a mold M, and the mold M is separated from a cured product of the imprint material IM. With the imprint process, a pattern made of a cured product of the imprint material IM is formed on the substrate S.

As an imprint material, a curable composition (to be also referred to as a resin in an uncured-state) that is cured by receiving curing energy is used. Examples of the curing energy can be an electromagnetic wave, heat, and the like. The electromagnetic wave can be light selected from the wavelength range of 10 nm (inclusive) to 1 mm (inclusive), for example, infrared light, a visible light beam, ultraviolet light, or the like. The curable composition can be a composition cured with light irradiation or heating. A photocurable composition cured by light irradiation contains at least a polymerizable compound and a photopolymerization initiator, and may further contain a nonpolymerizable compound or a solvent as needed. The nonpolymerizable compound is at least one material selected from the group consisting of a sensitizer, a hydrogen donor, an internal mold release agent, a surfactant, an antioxidant, and a polymer component. The imprint material can be arranged on the substrate in the form of droplets or in the form of an island or film obtained by connecting a plurality of droplets. The viscosity (the viscosity at 25° C.) of the imprint material can be, for example, 1 mPa·s (inclusive) to 100 mPa·s (inclusive). As the material of the substrate, for example, glass, a ceramic, a metal, a semiconductor, a resin, or the like can be used. A member made of a material different from the substrate may be provided on the surface of the substrate, as needed. The substrate is, for example, a silicon wafer, a compound semiconductor wafer, or silica glass. In the specification and the accompanying drawings, directions will be indicated on an XYZ coordinate system in which a direction parallel to the surface of the substrate S is defined as the X-Y plane. Directions parallel to the X-axis, the Y-axis, and the Z-axis of the XYZ coordinate system are referred to as the X direction, the Y direction, and the Z direction, respectively. A rotation about the X-axis, a rotation about the Y-axis, and a rotation about the Z-axis are indicated by θX, θY, θZ, respectively. Controlling or driving with respect to the X-axis, Y-axis, and Z-axis means controlling or driving with respect to directions parallel to the X-axis, directions parallel to the Y-axis, and directions parallel to the Z-axis, respectively. Controlling or driving with respect to the θX-axis, θY-axis, and θZ-axis means controlling or driving with respect to rotation about an axis parallel to the X-axis, rotation about an axis parallel to the Y-axis, and rotation about an axis parallel to the Z-axis, respectively. The position is information that can be specified based on the coordinates of the X, Y, and Z axes, and the orientation is information that can be specified by the values of the θX, θY, and θZ axes. Positioning means controlling the position and/or the posture. Alignment can include controlling the position and/or the posture of at least one of a substrate and a mold.

The imprint apparatus IMP can include the substrate holder 102 that holds the substrate S, a substrate driving mechanism 105 that drives the substrate S by driving the substrate holder 102, a base 104 that supports the substrate holder 102, and a position measurement device 103 that measures the position of the substrate holder 102. The substrate driving mechanism 105 can include, for example, a motor such as a linear motor.

The imprint apparatus IMP can include a mold holder 121 that holds the mold M, a mold driving mechanism 122 that drives the mold M by driving the mold holder 121, and a support structure 130 that supports the mold driving mechanism 122. The mold driving mechanism 122 can include, for example, a motor such as a voice coil motor.

The substrate driving mechanism 105 and the mold driving mechanism 122 form a driving mechanism for adjusting a relative position and a relative posture between the substrate S and the mold M. The adjustment of the relative position between the substrate S and the mold M by the driving mechanism includes a driving operation to bring the mold into contact with the imprint material on the substrate S and a driving operation to separate the mold from the cured imprint material (a pattern made of the cured product). The substrate driving mechanism 105 may be configured to drive the substrate S about a plurality of axes (for example, three axes including the X-axis, Y-axis, and θZ-axis, and preferably six axes including the X-axis, Y-axis, Z-axis, θX-axis, θY-axis, and θZ-axis). The mold driving mechanism 122 may also be configured to drive the mold M about a plurality of axes (for example, three axes including the Z-axis, θX-axis, and θY-axis, and preferably six axes including the X-axis, Y-axis, Z-axis, θX-axis, θY-axis, and θZ-axis).

The imprint apparatus IMP can include a mold conveyance mechanism 140 that conveys the mold M, and a mold cleaner 150. The mold conveyance mechanism 140 can be configured to, for example, convey the mold M to the mold holder 121 and convey the mold M from the mold holder 121 to an original stocker (not shown), the mold cleaner 150, or the like. The mold cleaner 150 cleans the mold M by using ultraviolet light, a chemical solution, or the like.

The mold holder 121 can include a window member 125 that forms a pressure-controlled space CS on the side of a reverse surface (a surface on a side opposite to the pattern region MP on which the pattern to be transferred to the substrate S has been formed) of the mold M. The imprint apparatus IMP can include a deformation mechanism 123 that controls the pressure (to be referred to as a cavity pressure hereinafter) of the pressure-controlled space CS to deform the pattern region MP of the mold M into a convex shape toward the substrate S as schematically shown in FIG. 1B.

The imprint apparatus IMP can include an alignment measurement device 106, a wide-angle alignment measurement device 151, a curing device 107, an imaging device 112, and an optical member 111. The alignment measurement device 106 illuminates an alignment mark of the substrate S and an alignment mark of the mold M and captures the images of the marks, thereby measuring the relative position between the marks. The alignment measurement device 106 can be positioned by a driving mechanism (not shown) in accordance with the positions of the alignment marks to be observed. The wide-angle alignment measurement device 151 is a measurement device having a field wider than that of the alignment measurement device 106. The wide-angle alignment measurement device 151 illuminates an alignment mark of the substrate S and captures the image of the alignment mark, thereby measuring the position of the substrate S. By measuring the position of the substrate S by the wide-angle alignment measurement device, it is possible to move the alignment mark of the substrate S into the field of the alignment measurement device 106.

The curing device 107 irradiates the imprint material IM with an energy (for example, light such as ultraviolet light) for curing the imprint material IM via the optical member 111, and cures the imprint material IM with this energy. The imaging device 112 captures images of the substrate S, the mold M, and the imprint material IM via the optical member 111 and the window member 125.

Figure 2:
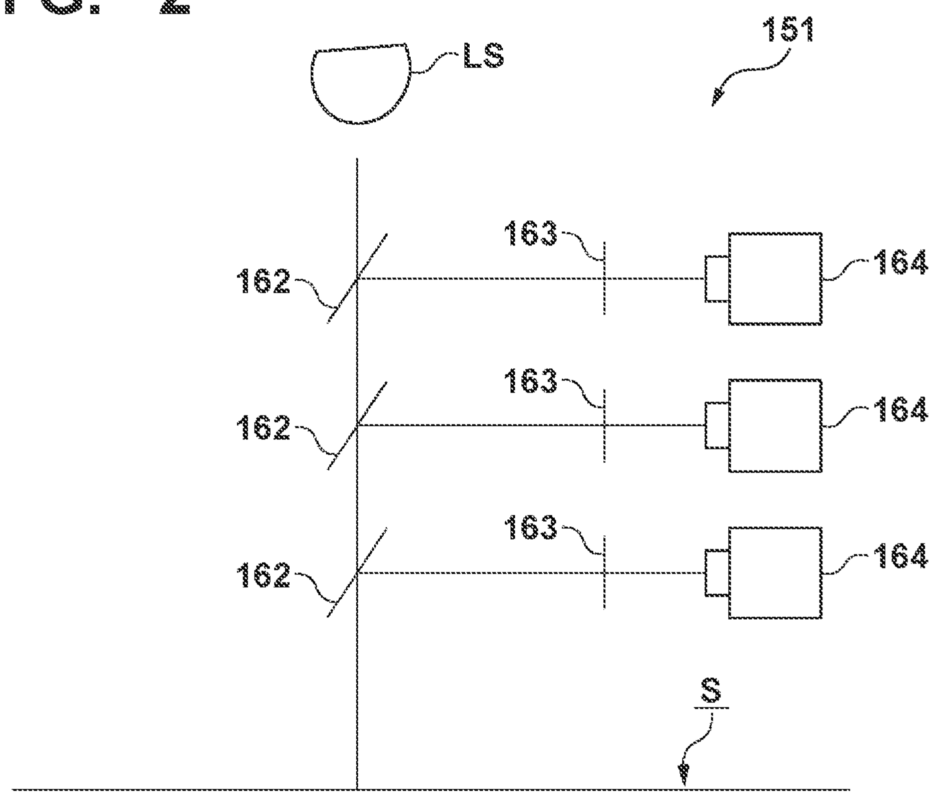
FIG. 2 is a view showing the configuration of a wide-angle alignment measurement device.

The wide-angle alignment measurement device 151 may include a mechanism for switching the wavelength of illumination light. For example, the wide-angle alignment measurement device 151 includes a wavelength filter arranged on an optical path, and a mechanism for switching the wavelength filter. Alternatively, as shown in FIG. 2, the wide-angle alignment measurement device 151 may have an arrangement enabling simultaneous capturing of images of a plurality of wavelengths. The wide-angle alignment measurement device 151 shown in FIG. 2 includes a light source LS, a plurality of half mirrors 162 each branching off from the optical path, a plurality of wavelength filters 163 that transmit different wavelengths, and a plurality of imaging elements 164 so that it can simultaneously capture images of different wavelengths. Further, the wide-angle alignment measurement device 151 may include a mechanism for switching the light amount of illumination light. For example, the wide-angle alignment measurement device 151 may include a mechanism for switching an ND filter to be arranged on the optical path. The wide-angle alignment measurement device 151 may further include a plurality of optical systems such as a bright-field optical system and a dark-field optical system, and a mechanism for switching the optical system through which the image to be captured passes. The wide-angle alignment measurement device 151 may also include a mechanism for switching polarization of illumination light or received light. For example, the wide-angle alignment measurement device 151 can include a mechanism for switching a polarizing filter to be arranged on the optical path.

The imprint apparatus IMP can include a dispenser 108 for arranging the imprint material IM on the substrate S. For example, the dispenser 108 discharges the imprint material IM such that the imprint material IM is arranged on the substrate S in accordance with a drop recipe indicating the arrangement of the imprint material IM. The imprint apparatus IMP can include a controller 110 that controls the substrate driving mechanism 105, the mold driving mechanism 122, the deformation mechanism 123, the mold conveyance mechanism 140, the mold cleaner 150, the alignment measurement device 106, the curing device 107, the imaging device 112, the dispenser 108, and the like. The controller 110 can be formed by, for example, a Programmable Logic Device (PLD) such as a Field Programmable Gate Array (FPGA), an Application Specific Integrated Circuit (ASIC), a general-purpose computer installed with a program, or a combination of all or some of these components.

Figure 3:
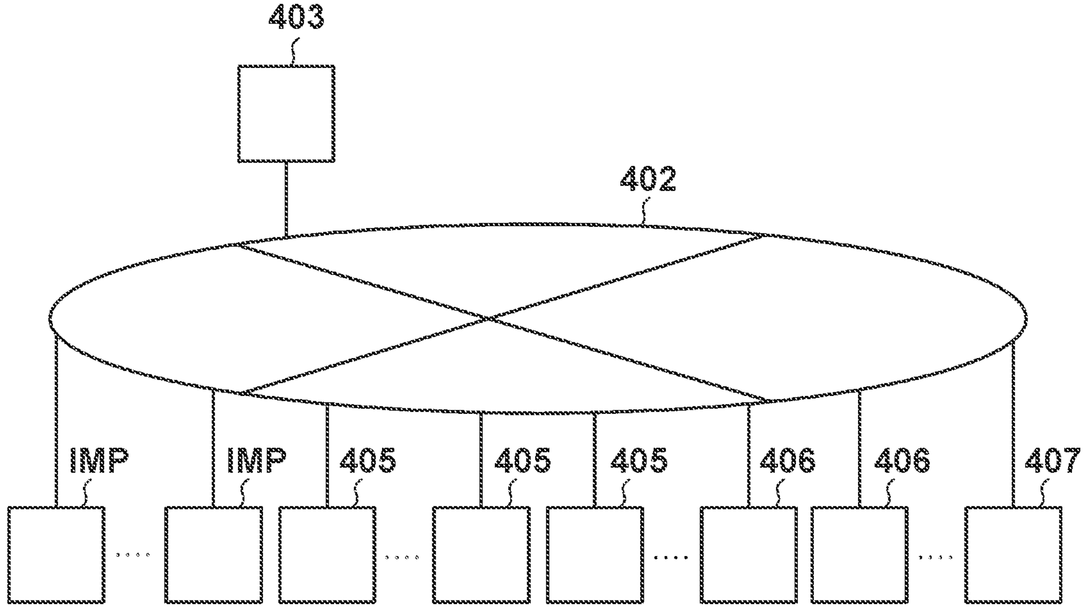
FIG. 3 is a view showing the configuration of an article manufacturing system.

FIG. 3 exemplarily shows the arrangement of an article manufacturing system 401 for manufacturing an article such as a semiconductor device. The article manufacturing system 401 can include, for example, one or a plurality of the imprint apparatuses IMP and one or a plurality of inspection apparatuses 405 (for example, an overlay inspection apparatus and/or a CD inspection apparatus and/or a defect inspection apparatus and/or an electrical characteristics inspection apparatus). The article manufacturing system 401 can also include one or a plurality of substrate processing apparatuses 406 (an etching apparatus and/or a deposition apparatus). The article manufacturing system 401 can further include an evaluation apparatus 407 to be described later. These apparatuses can be connected to a control apparatus 403, which is an external apparatus different from the imprint apparatus IMP, via a network 402 and controlled by the control apparatus 403.

The evaluation apparatus 407 is formed by an information processing apparatus, and the information processing apparatus can be formed by, for example, a Programmable Logic Device (PLD) such as a Field Programmable Gate Array (FPGA), an Application Specific Integrated Circuit (ASIC), a general-purpose computer installed with a program, or a combination of all or some of these components.

FIG. 14 shows an arrangement example of the evaluation apparatus 407. The evaluation apparatus 407 can include a controller 4071, a RAM 4072 that temporarily stores data and provides a work area to the controller 4071, and a ROM 4073 storing permanent data and programs. The evaluation apparatus 407 can further include a storage device 4074, a display device 4076, and an input device 4075. The storage device 4074 stores a program **4074*a* for executing an evaluation method according to this embodiment. A network I/F 4077 is an interface for connection with the network 402. In this embodiment, the network I/F 4077 can function as an obtaining device for obtaining an image including a composition formed on a substrate by forming processing. Further, the controller 4071 can function as a processing device for processing the obtained image for evaluation. The controller 4071 can also function as a display controller for controlling display of the display device 4076**.

Note that the function of the evaluation apparatus 407 may be implemented using the controller 110 of the imprint apparatus IMP, the control apparatus 403, the inspection apparatus 405, or a combination thereof. In the present embodiment, a system including the imprint apparatus IMP and the evaluation apparatus 407 may be understood as a film forming system or a lithography system.

A lithography method according to this embodiment will be described below. In this embodiment, after performing the imprint process, an image including a region (evaluation region) including a shot region (film forming region), which is a region where the pattern is to be formed, and its vicinity is obtained by image capturing. Extrusion and unfilling are detected using the obtained image. Machine learning is used to detect extrusion and unfilling. In the machine learning, abnormality detection can be implemented using an object detection algorithm.

Figure 4:
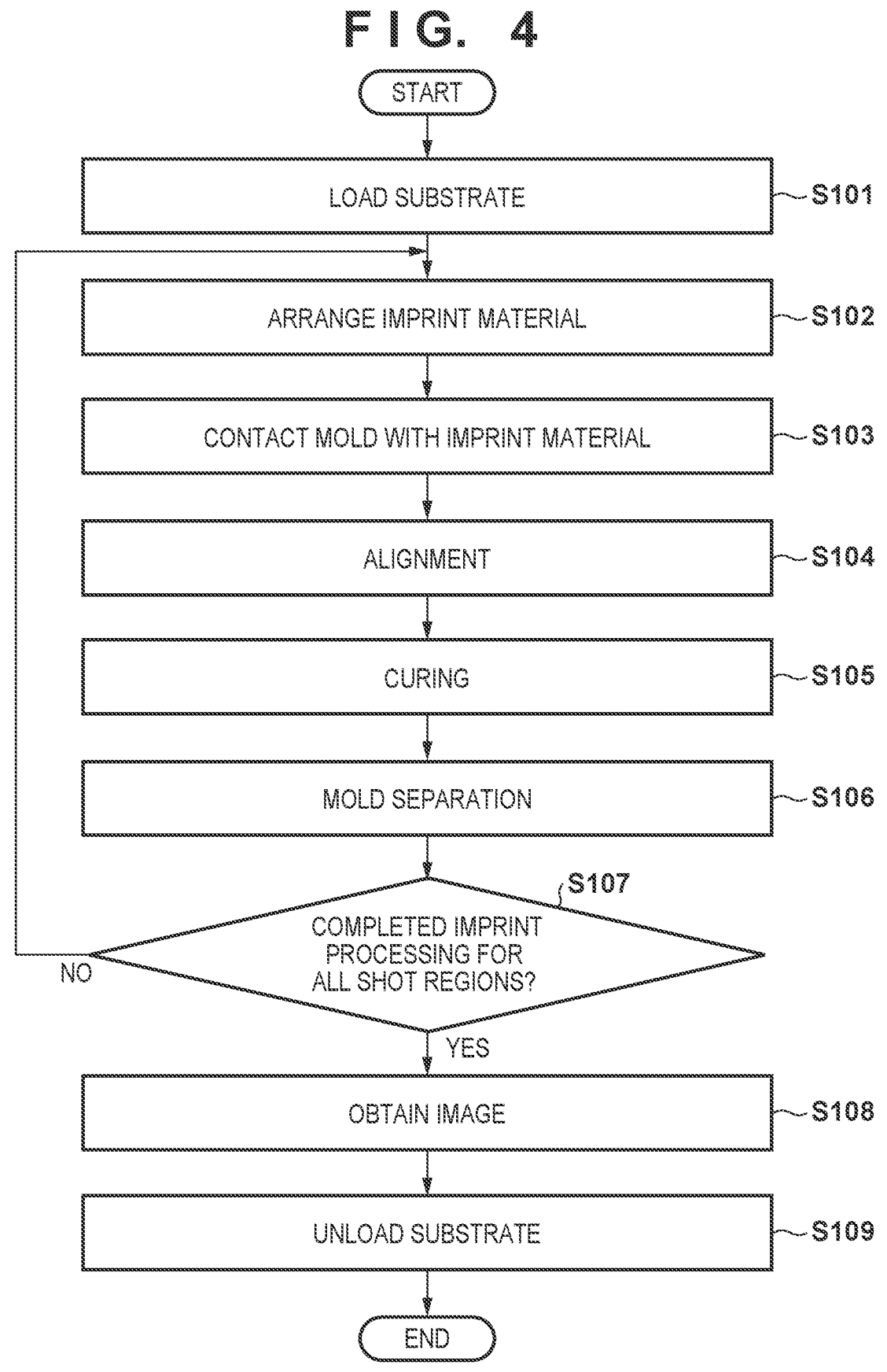

The operation of the imprint apparatus IMP will be described with reference to the flowchart of FIG. 4. Operations shown in FIG. 4 can be controlled by the controller 110.

In step S101, the substrate S is conveyed, by a substrate conveyance mechanism (not shown), from a conveyance source (for example, a relay portion between a preprocessing apparatus and the imprint apparatus IMP) onto the substrate holder 102. The position of the conveyed substrate S on the substrate holder 102 is measured by observing the mark on the substrate S by the wide-angle alignment measurement device 151. The controller 110 positions the substrate S based on the position obtained by the measurement.

In steps S102 to S106, an imprint process (pattern formation) is performed on a shot region selected from a plurality of shot regions of the substrate S.

In step S102, the imprint material IM is arranged on the selected shot region by the dispenser 108. This processing can be performed by discharging the imprint material IM from the dispenser 108 while driving the substrate S by the substrate driving mechanism 105.

In step S103, the substrate S and the mold M are driven relatively by at least one of the mold driving mechanism 122 and the substrate driving mechanism 105 such that the pattern region MP of the mold M is brought into contact with the imprint material IM on the shot region. In one example, the mold M is driven by the mold driving mechanism 122 such that the pattern region MP of the mold M is brought into contact with the imprint material IM on the shot region. In the processing of bringing the pattern region MP of the mold M into contact with the imprint material IM, the pattern region MP of the mold M can be deformed into a convex shape toward the substrate S by the deformation mechanism 123.

In step S104, alignment between the shot region of the substrate S and the pattern region MP of the mold M can be performed. The alignment can be performed, while measuring the relative position between the alignment mark of the shot region and the alignment mark of the mold M by the alignment measurement device 106, so as to make the relative position fall within an allowable range of a target relative position. In the alignment, the substrate S and the mold M can be driven relatively by at least one of the mold driving mechanism 122 and the substrate driving mechanism 105. The target relative position between the alignment mark of the shot region to be imprinted and the alignment mark of the mold M can be decided based on a correction value determined from a past result of the overlay inspection apparatus or the like.

In step S105, the curing device 107 applies the energy for curing the imprint material IM to the imprint material IM between the substrate S and the pattern region MP of the mold M. With this, the imprint material IM is cured, and a cured product of the imprint material IM is formed.

In step S106, the substrate S and the mold M are driven relatively by at least one of the mold driving mechanism 122 and the substrate driving mechanism 105 so as to separate the cured product of the imprint material IM from the pattern region MP of the mold M. In one example, the mold M is driven by the mold driving mechanism 122 so as to separate the cured product of the imprint material IM from the pattern region MP of the mold M. Also when separating the cured product of the imprint material IM from the pattern region MP of the mold M, the pattern region MP of the mold M can be deformed into a convex shape toward the substrate S. Further, image capturing by the imaging device 112 is performed, and the separation state between the imprint material IM and the mold M is observed based on the captured image.

In step S107, the controller 110 determines whether the imprint process in steps S102 to S106 has been performed for all the shot regions of the substrate S. If the imprint process in steps S102 to S106 has been performed for all the shot regions of the substrate S, the process advances to step S108. If there is any unprocessed shot region, the process returns to step S102. In this case, the imprint process in steps S102 to S106 is performed on the shot region selected from the unprocessed shot regions.

In step S108, an image including the shot region (film forming region) after the imprint process is obtained for detecting an abnormality. For example, the controller 110 uses the wide-angle alignment measurement device 151 to capture an image including the shot region and its vicinity. If the field of the wide-angle alignment measurement device 151 is small for the shot region, a plurality of images may be captured to capture the desired region while changing the position of the substrate S by driving the substrate driving mechanism 105. The image captured in step S108 can be used as an image for learning to be described later. The image captured in step S108 can be also used as an image for abnormality detection. Here, an example is described in which the wide-angle alignment measurement device 151 captures the image, but the present invention is not limited to this. For example, the alignment measurement device 106, the imaging device 112, or the like may be used to capture the image.

In the procedure described above, step S108 is performed after the imprint process has been performed for all of the plurality of shot regions, but the present invention is not limited to this. For example, the image of the pattern after the imprint process may be captured for each shot region after the pattern is formed in the shot region (after step S106). Further, as will be described later, an apparatus other than the imprint apparatus may capture, in a method similar to step S108, the image of the pattern of the substrate unloaded from the imprint apparatus.

In step S109, the substrate S is conveyed from the substrate holder 102 to a conveyance destination (for example, a relay portion between the imprint apparatus IMP and a post-processing apparatus) by a substrate conveyance mechanism (not shown). When processing a lot formed by a plurality of substrates, the operations shown in FIG. 4 are performed for each of the plurality of substrates.

Figure 5A:
FIGS. 5A and 5B are views showing extrusion and unfilling.
Figure 5B:
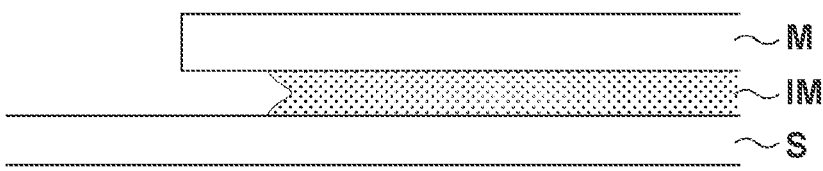

Next, an abnormality in the imprint result will be described. Each of FIGS. 5A and 5B is a side view showing a state in which the mold M and the imprint material IM on the substrate S are in contact with each other (after step S103 is completed, for example, in steps S104 and S105). Extrusion means a state in which the imprint material IM protrudes from the contact region between the mold M and the imprint material IM as shown in FIG. 5A. Unfilling means a state in which a portion where the imprint material IM is not filled between the mold M and the substrate S is generated as shown in FIG. 5B.

Figure 6A:
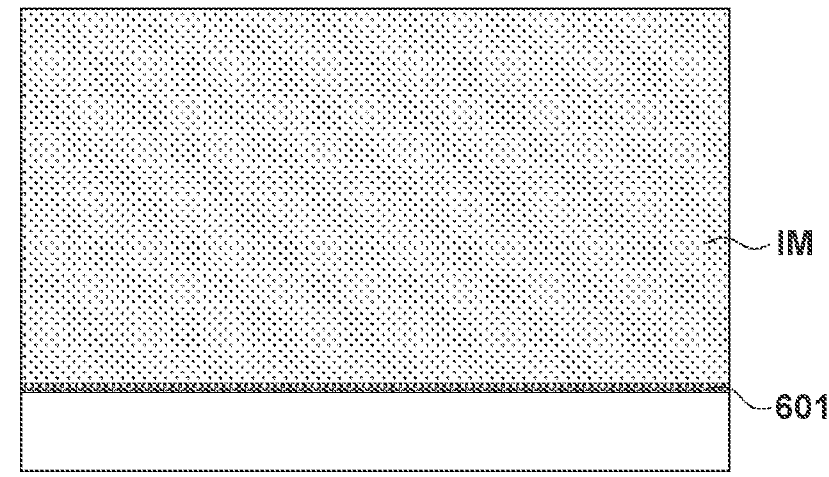
FIGS. 6A to 6C are views showing images including extrusion and unfilling.
Figure 6B:
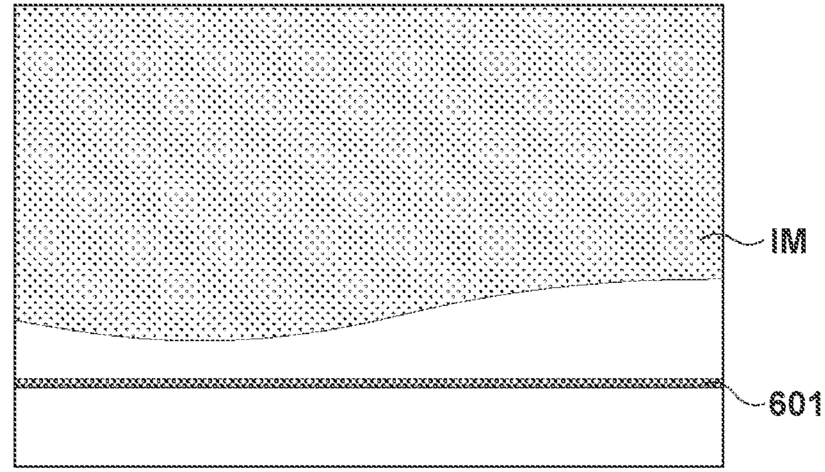
Figure 6C:
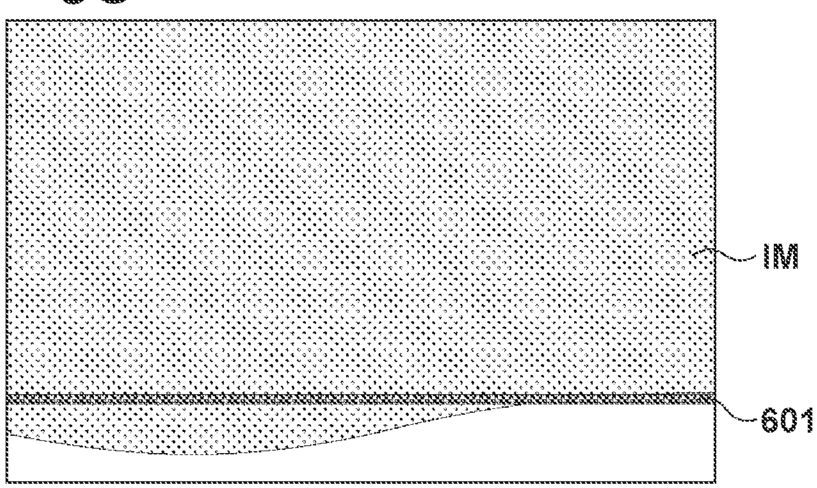

FIGS. 6A to 6C show examples of images to be captured in step S108 when extrusion and unfilling have occurred. Each of FIGS. 6A to 6C shows the image in a state in which the pattern of the imprint material IM has been formed in the shot region by the imprint process. In a normal state, as shown in FIG. 6A, the pattern is formed while the imprint material IM is filled up to a boundary 601 of the shot region. On the other hand, in a case of unfilling, as shown in FIG. 6B, the imprint material IM does not reach the boundary 601 of the shot region and an unfilled portion is captured as a white portion (or a black portion). In a case of extrusion, as shown in FIG. 6C, the imprint material IM protrudes from the boundary 601 of the shot region and the imprint material IM extending beyond the boundary 601 is captured as a black portion (or a white portion).

Figure 7A:
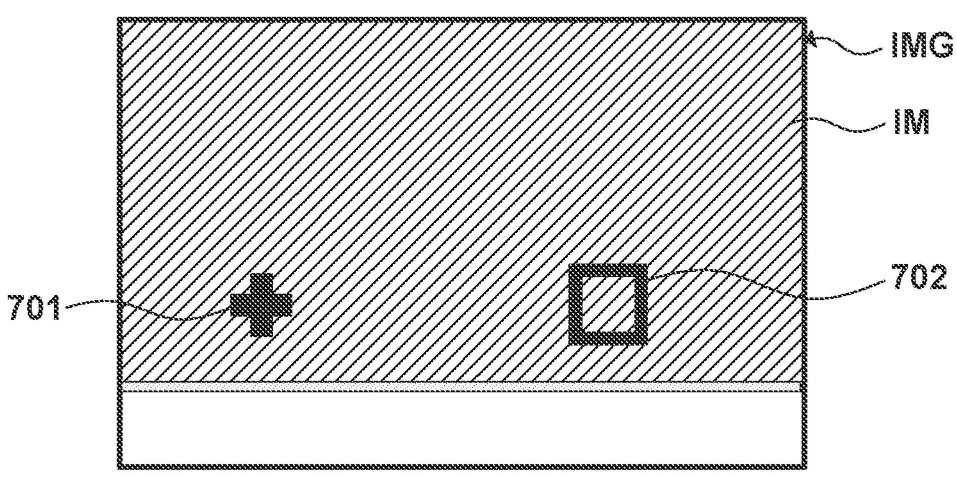
FIGS. 7A and 7B are views showing an example of unfilling that occurs at the positions of marks.
Figure 7B:
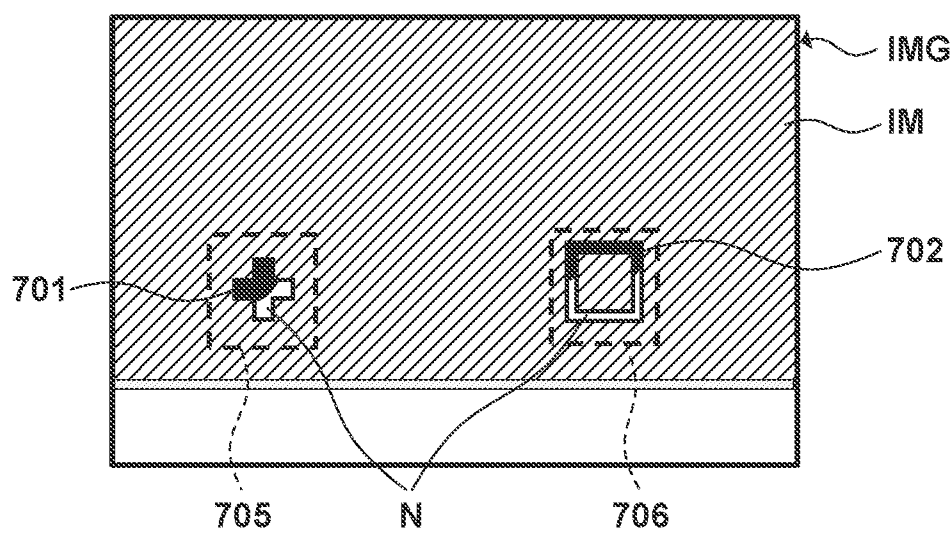

FIGS. 7A and 7B show an example of unfilling that occurs at the positions of marks to be used in alignment or inspection. Each of FIGS. 7A and 7B shows an image IMG of a shot region. A region indicated by gray in each image is a shot region that is an inspection target filed with the imprint material IM. The shot region includes a first mark 701 and a second mark 702, which have shapes different from each other. In FIG. 7A, the first mark 701 and the second mark 702 are represented by black, and a normal state in which the inside of each mark is filled with the imprint material IM is shown. On the other hand, in FIG. 7B, the first mark 701 and the second mark 702 are partially represented by white, and a state in which the inside of each mark is not sufficiently filled with the imprint material is shown (unfilled region N).

If the mold M comes into contact with the shot region in which extrusion has occurred, the pattern formed on the mold M may be broken. If unfilling occurs, no pattern is formed on that portion, and a defective semiconductor device is formed. Hence, it is necessary to detect the presence/absence of extrusion or unfilling after the imprint process and adjust the imprint conditions to prevent the above-described failure.

As an example of the adjustment method, a method of changing the amount of the imprint material to be supplied in accordance with the magnitude of extrusion or unfilling that has occurred can be considered. To do this adjustment, it is necessary to obtain the information of the position, the size, and the shape of a region where the amount of the imprint material is short or excessive. In this embodiment, these pieces of information are obtained (detected) from an image by machine learning. As the detection method, methods using a model or the like as will be described below can be used:

a model of a Convolutional Neural Network structure,
a model having a mechanism of AutoEncoder like U-net,
a model based on a R-CNN (Region-Convolutional Neural Network).

When a method using these models is used, it is calculated, for each pixel of an image, whether the inspection target object exists. By labelling these, a detailed shape of the object can be obtained.

Figure 8A:
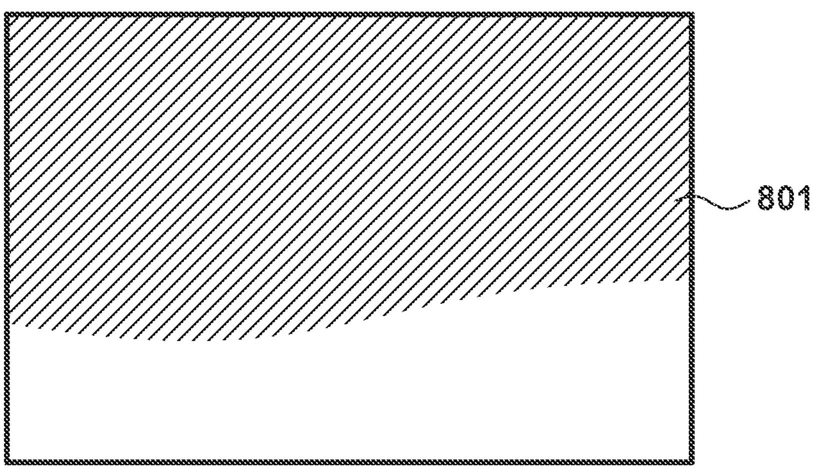
FIGS. 8A and 8B are views showing an example of an image in which the boundary of a shot region and the original shapes of the marks are unknown.
Figure 8B:
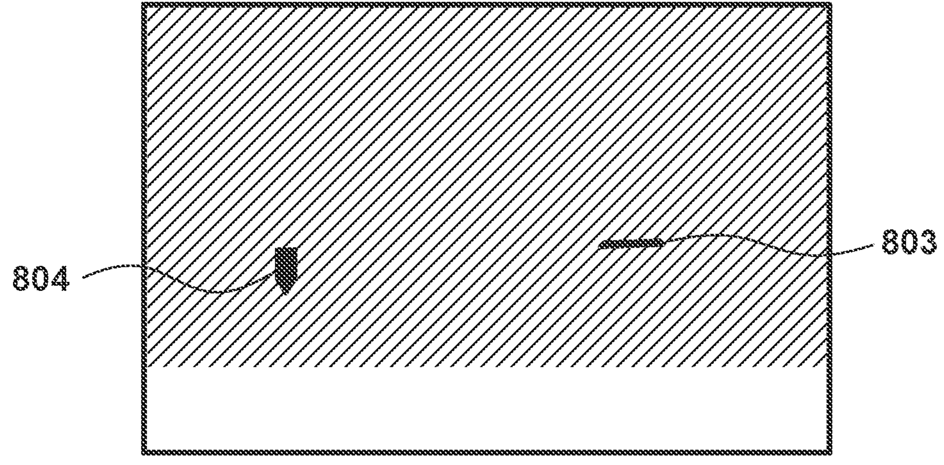

On the other hand, when detecting the position, the size, and the shape of an abnormality from a captured image, the following problem exists. In FIGS. 6A to 6C, a line representing a boundary 601 of a shot region is drawn, but such a line does not necessarily exist in fact. For this reason, if, for example, an image as shown in FIG. 8A is obtained by imaging, the boundary position of the shot region cannot be known only by the information of this image. It is therefore impossible to judge, concerning a region 801 of the imprint material, the size of unfilling or extrusion that exists. Also, if images of mark portions 802 and 803 as shown in FIG. 8B are obtained by imaging, whether these are abnormal cannot be judged based on only the images of the mark portions 802 and 803 unless the original shapes are known.

Figure 9A:
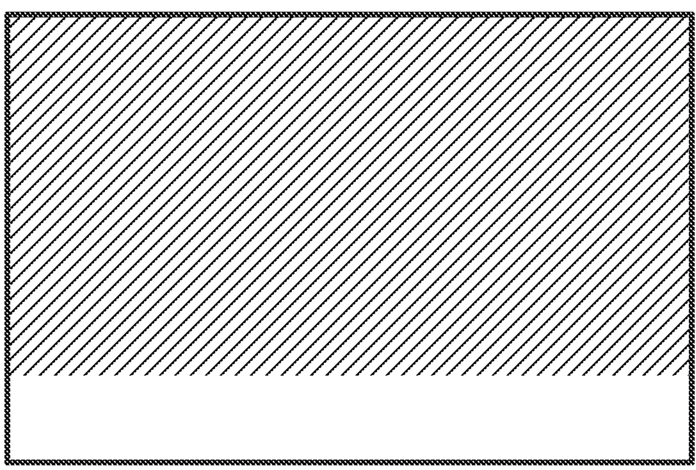
FIGS. 9A and 9B are views showing design information corresponding to an image obtained by imaging.
Figures 10A, 10B:
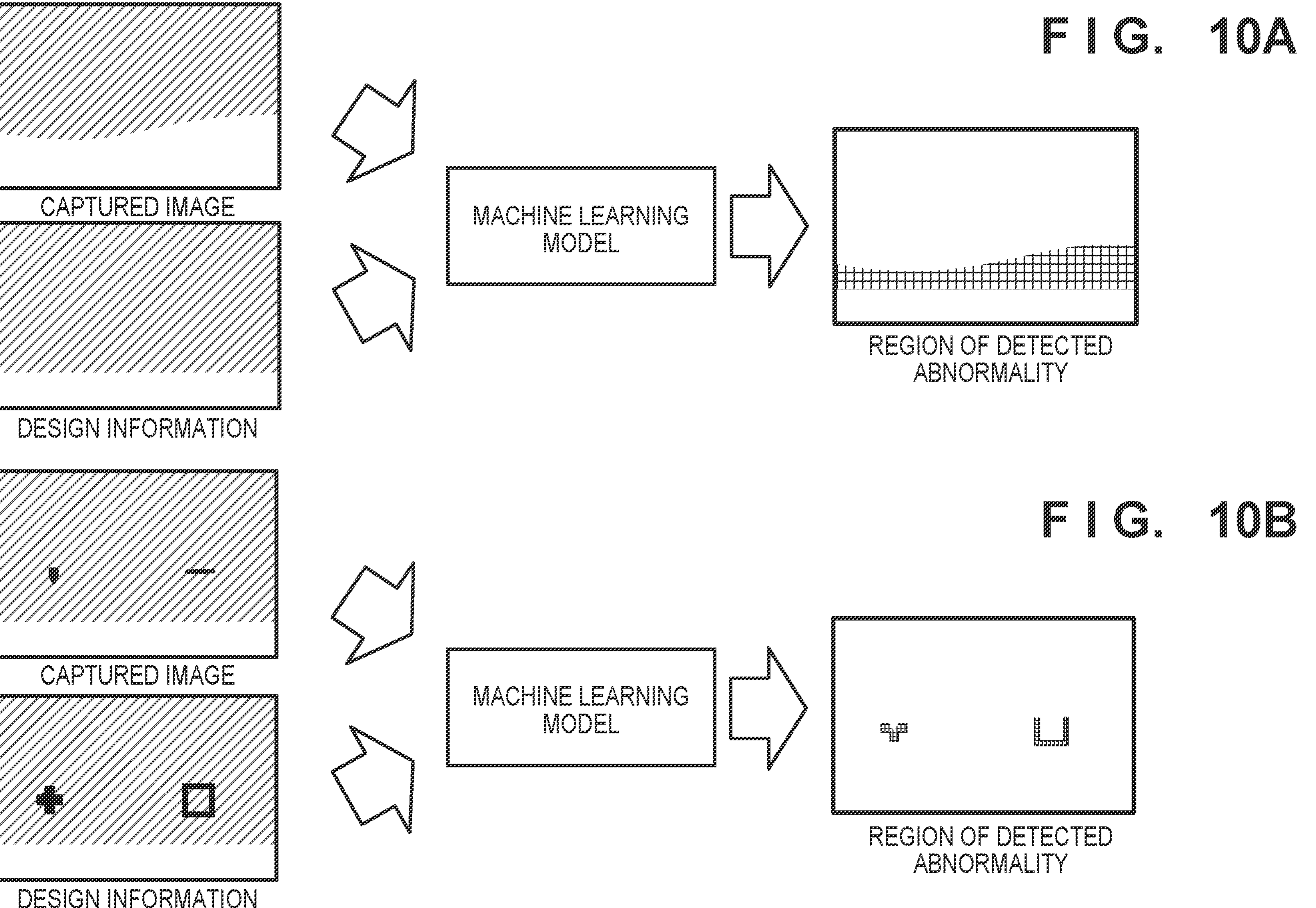
FIGS. 10A and 10B are views showing an example of information input to a machine learned model and information output from the machine learned model.

To cope with this problem, in this embodiment, abnormality detection using design information representing the geometrical feature of a shot region is performed. The geometrical feature of a shot region can include pieces of information that specify the boundary position of the shot region and the position and the shape of each mark in the shot region, as will be described later. These pieces of information will be referred to as "design information" hereinafter. FIG. 9A shows an image representing design information corresponding to a position where the image shown in FIG. 6A is captured. The image in FIG. 9A shows to which extent the imprint material IM in FIG. 6A should be filled. In this embodiment, as shown in FIG. 10A, two images, that is, the image shown in FIG. 6A obtained by imaging and the image shown in FIG. 9A representing the design information are input as feature amounts to the machine learned model. This allows the machine learned model to recognize the boundary of the shot region and correctly detect the position and the size of unfilling or extrusion.

Figure 9B:
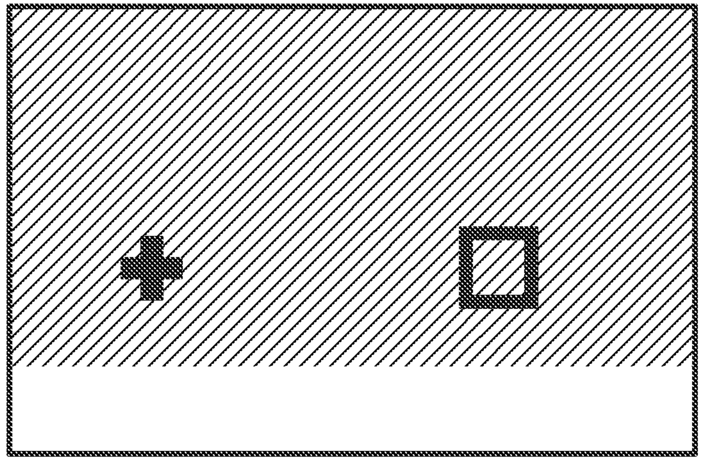

The image shown in FIG. 9B is an image representing design information (the positions and the sizes) of marks corresponding to a position where the image shown in FIG. 7A is captured. The image in FIG. 9B shows the correct shapes and the positions of the marks shown in FIG. 7A. In this embodiment, as shown in FIG. 10B, two images, that is, the image shown in FIG. 6B obtained by imaging and the image shown in FIG. 9B representing the design information are input as feature amounts to the machine learned model. This allows the machine learned model to correctly detect an unfilled region of each mark portion.

Also, in a semiconductor device, normally, a circuit is formed by forming different patterns a plurality of times in a superimposed manner. Hence, in some cases, a pattern is already formed on the substrate, and an image obtained by imaging includes a pattern other than the detection target pattern. At this time, it is possible to perform efficient and correct abnormality detection by excluding the pattern other than the detection target from the design information of the already formed pattern that is not the detection target.

Also, in the above-described example, a method of representing design information in the form of an image and inputting the image representing the design information to the machine learned model has been described. As an alternate, design information may represent the shape of the shot boundary or the shape of a mark as the information of a vertex, a line segment, or a polygon, and the information may be input to the machine learned model.

The design information, that is, the geometrical feature of the shot region which specifies the boundary position of the shot region or the position and the shape of each mark in the shot region can be obtained from, for example, recipe information input in advance for pattern formation. Alternatively, the design information may be obtained by performing measurement using an imaging apparatus or a measurement apparatus for a substrate correctly (without occurrence of an abnormality) imprinted under the same conditions as the inspection target.

In this embodiment, a shot end region and an abnormality of a mark have been described. However, an abnormality associated with a pattern other than a mark formed on the shot region can also be detected in a similar manner.

Figure 11:
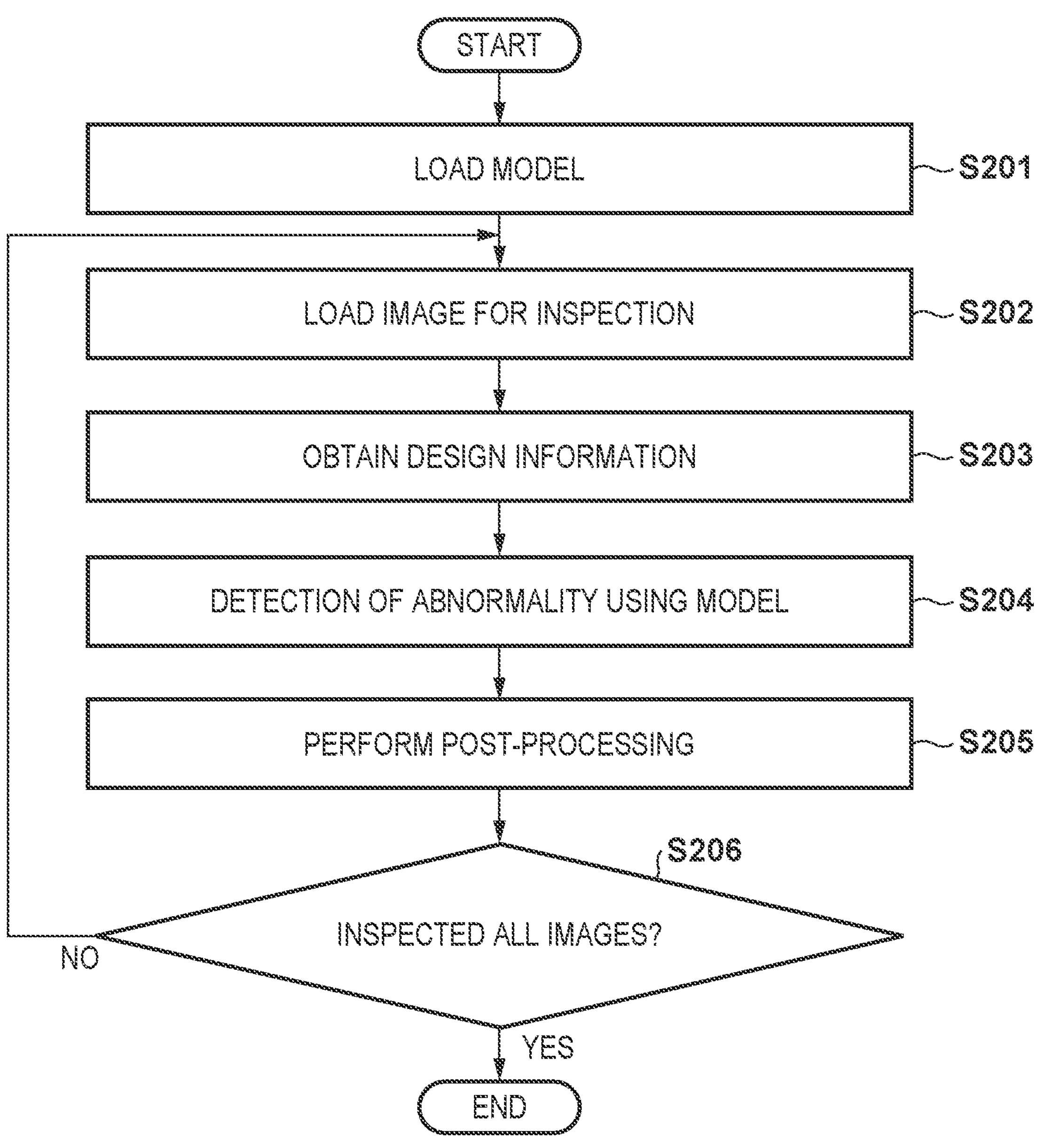
FIG. 11 is a flowchart showing a method of detecting an abnormality from an image.

An image evaluation method executed by the evaluation apparatus 407 will be described with reference to the flowchart of FIG. 11. In the evaluation method, an abnormality included in an image obtained in step S108 is detected, and the type of the abnormality (extrusion/unfilling) is determined. The program of the evaluation method corresponding to the flowchart of FIG. 11 is stored in, for example, the storage device 4074, loaded into the RAM 4072, and executed by the controller 4071 (processor).

In step S201, the controller 4071 loads a machine learned model (an inference model, which will also simply be referred to as a "model" hereinafter) that outputs the features of one or more abnormalities in an image. The model is a model created in advance using an image obtained under the conditions of the imprint material of the inspection target and conditions similar to the measurement conditions of the image obtained in step S108. The model creation procedure will be described later.

After that, the processes of steps S202 to S205 are repeated, thereby obtaining an inspection result for each image.

In step S202, the controller 4071 loads the image obtained in step S108 as an image for inspection.

In step S203, the controller 4071 obtains the design information of a pattern corresponding to the image loaded in step S202.

In step S204, the controller 4071 gives the image loaded in step S202 and the design information obtained in step S203 as an input to the model loaded in step S201 and obtains the features of an abnormality on the input image as an output. The features of the abnormality are obtained for each abnormality on the image. The obtained features of the abnormality can include the abnormality type (extrusion/unfilling), the coordinates of the vertices of a rectangle surrounding the abnormality region, the likelihood of the detected abnormality, and the like in addition to the position, the size, and the shape of the abnormality. Here, the likelihood of the detected abnormality is a value representing the reliability of the inspection result, and is automatically calculated by the model for each detected abnormality. The types of detectable abnormalities are extrusion and unfilling as described above. Abnormalities of other types can also be detected by causing the model to learn these.

In step S205, the controller 4071 performs post-processing for the output from the model obtained in step S204. For example, the post-processing can include comparing, concerning each of the various kinds of detected abnormalities, the likelihood of the abnormality with a predetermined threshold and classifying the abnormality. For example, in a case where the likelihood is expressed by a value from 0 to 1, an abnormality whose likelihood is 0.5 or less can be classified as an abnormality that is not the inspection target. Classification conditions such as the threshold used to perform classification based on the likelihood can be changed based on various kinds of data such as the imprint material of the inspection target, recipe information, light control conditions in imaging, and the mode in imaging.

Figure 13:
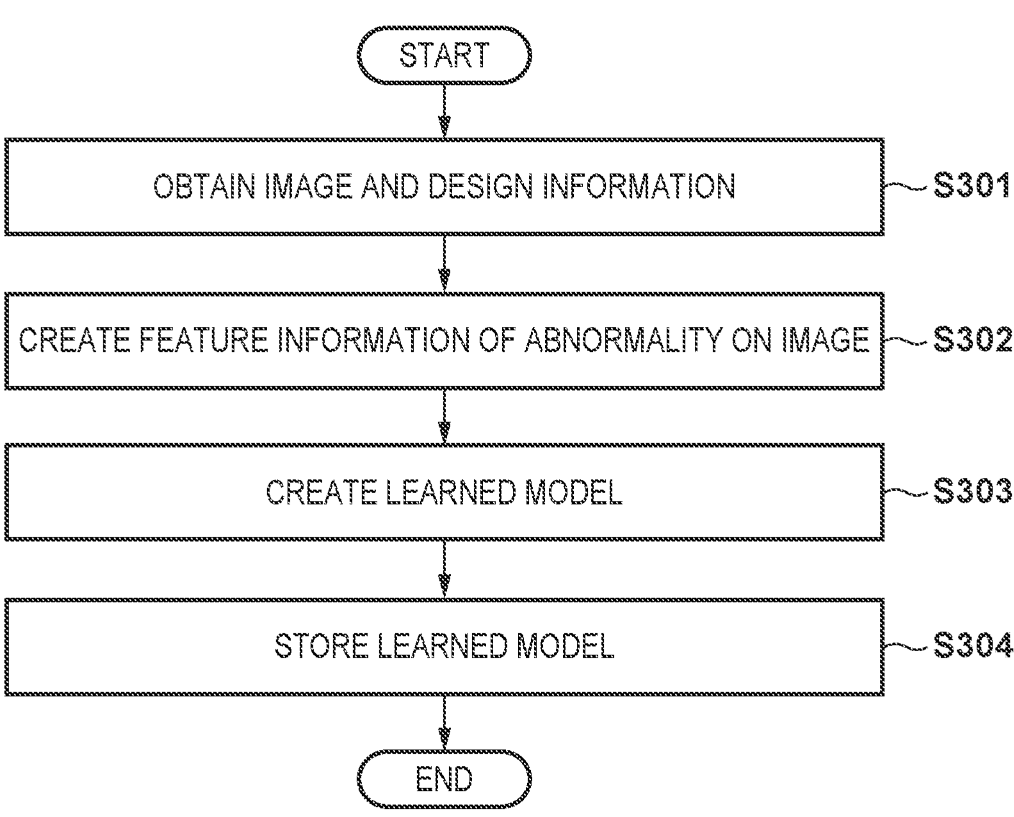
FIG. 13 is a flowchart of a learned model creation method.

Next, with reference to FIGS. 12 and 13, a method of calculating (learning), by the evaluation apparatus 407, the inference model (learned model) for abnormality detection will be described. FIG. 12 is a schematic view showing a method executed upon learning and inspection. FIG. 13 is a flowchart for learning the abnormality detection. The evaluation apparatus 407 can include a machine learning device that generates the inference model by machine learning. The machine learning device performs machine learning while using, as an input to the inference model, an image including a composition formed on a substrate by forming processing and, as supervised data, the relationship between a plurality of images obtained in advance and feature information of respective abnormalities in the plurality of images. A specific example will be described below.

In step S301, the controller 4071 obtains a learning image 801 (for example, by image capturing) as in step S108. More specifically, based on the condition of the material and the measurement condition to be used when capturing an inspection image, the controller 4071 collects the image 801 similar to the inspection image. Further, the controller 4071 uses a plurality of substrates to collect the learning images 801 of a plurality of shot regions of the plurality of substrates. A larger number of images used for learning are preferable, and the image includes the sufficient number of samples of abnormalities as detection targets. In addition, the controller 4071 obtains design information 802 corresponding to the learning images 801, as in S203.

In step S302, feature information of the abnormality corresponding to each image obtained in step S301 is created. More specifically, after visually inspecting each of the obtained images, feature information 803 including information such as the category, size, and position of the abnormality is created for each of all the abnormalities existing in each images.

In step S303, the controller 4071 performs machine learning on the relationship between the image and the design information obtained in S301 and the abnormality feature information 803 created in S302 to create a learned model. Here, for example, optimization is performed by using the image 801 and the design information 802 as input data for a neural network created in advance and using the abnormality feature information 803 as an output (supervisor). The learned model (neural network) 804 is created by this optimization.

In step S304, the controller 4071 stores the created learned model 804 in a storage device 805.

In the above example, the evaluation apparatus 407 is described as an information processing apparatus that performs both learning and inspecting. However, an information processing apparatus for learning and an information processing apparatus for inspecting may be configured separately. In that case, a first information processing apparatus creates a learned model and transfers the learned model to a second information processing apparatus that performs the inspection. The second information processing apparatus uses the learned model transferred from the first information processing apparatus to inspect an input image.

According to the embodiment described above, it is possible to automate abnormality detection in a shot region periphery, and finer classification of abnormalities can be performed.

Note that the imprint apparatus has been described in the above-described embodiments. As described above, in the case of the imprint apparatus, the "evaluation region" is a region including a shot region and its periphery. On the other hand, when the present disclosure is applied to a planarization apparatus, the "evaluation region" is assumed to be a region including the entire substrate.

<Embodiment of Article Manufacturing Method>

An article manufacturing method according to an embodiment of the present invention is suitable for manufacturing an article such as a microdevice, for example a semiconductor device, or an element having a microstructure. The article manufacturing method according to this embodiment can include a step of forming a layer of a composition on a substrate by a forming apparatus in a forming system, and a step of processing the substrate on which the layer has been formed. The manufacturing method further includes other known steps (oxidation, film formation, deposition, doping, planarization, etching, resist removal, dicing, bonding, packaging, and the like). The article manufacturing method of this embodiment is more advantageous than the conventional methods in at least one of the performance, quality, productivity, and production cost of the article.

The pattern of a cured product formed using the imprint apparatus is used permanently for at least some of various kinds of articles or temporarily when manufacturing various kinds of articles. The articles are an electric circuit element, an optical element, a MEMS, a recording element, a sensor, a mold, and the like. Examples of the electric circuit element are volatile and nonvolatile semiconductor memories such as a DRAM, a SRAM, a flash memory, and a MRAM and semiconductor elements such as an LSI, a CCD, an image sensor, and an FPGA. Examples of the mold are molds for imprint.

The pattern of the cured product is directly used as the constituent member of at least some of the above-described articles or used temporarily as a resist mask. After etching or ion implantation is performed in the substrate processing step, the resist mask is removed.

The article manufacturing method will be described next. In step SA in FIG. 15, a substrate 1*z* such as a silicon substrate with a processed material 2*z* such as an insulator formed on the surface is prepared. Next, an imprint material 3*z* is applied to the surface of the processed material 2*z* by an inkjet method or the like. A state in which the imprint material 3*z* is applied as a plurality of droplets onto the substrate is shown here.

Figure 15:
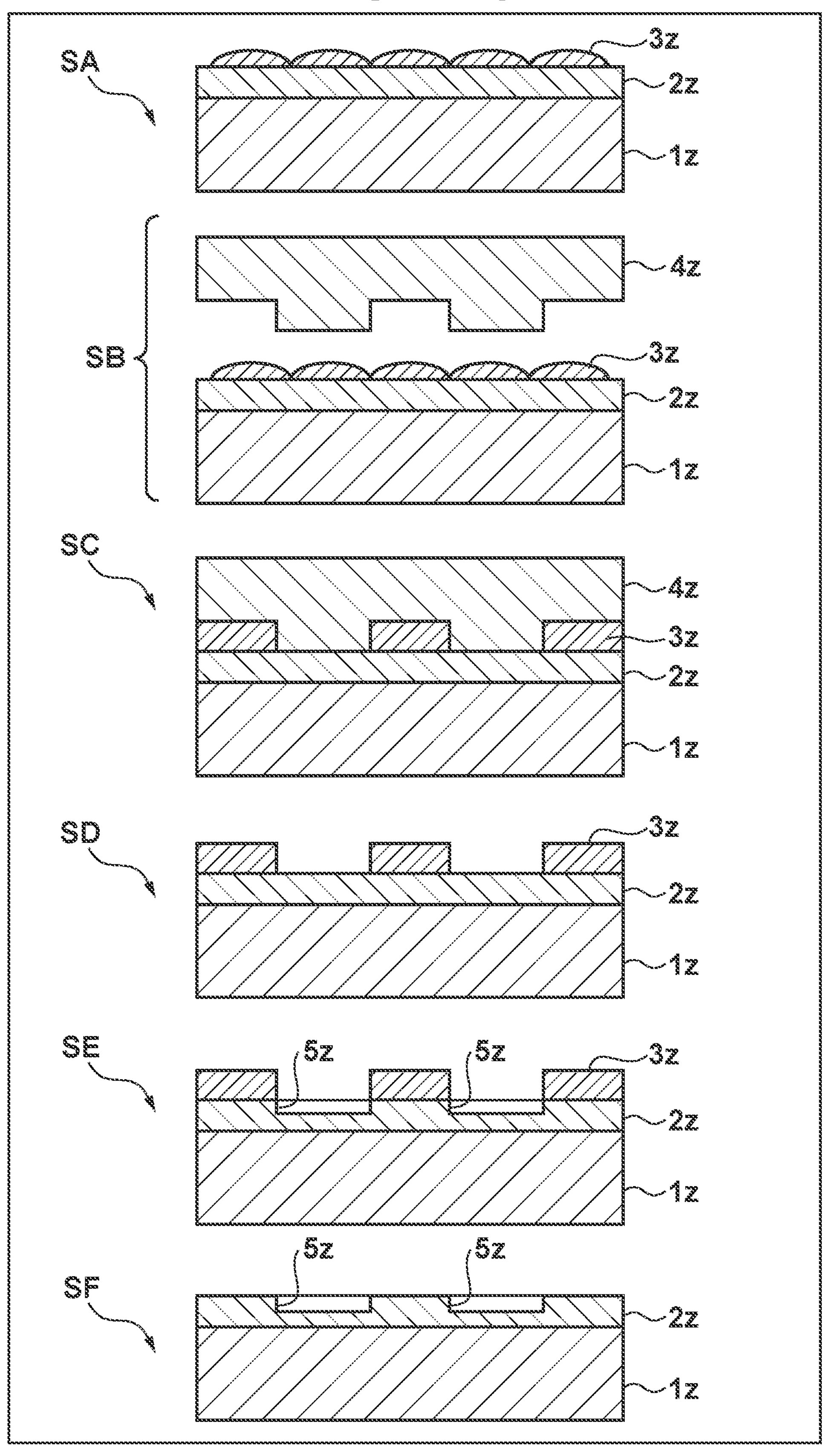
FIG. 15 is a view for explaining an article manufacturing method according to the embodiment.

In step SB in FIG. 15, a side of a mold 4*z* for imprint with a pattern having concave and convex portions is directed toward and made to face the imprint material 3*z* on the substrate. In step SC in FIG. 15, the substrate 1*z* to which the imprint material 3*z* is applied is brought into contact with the mold 4*z*, and a pressure is applied. The gap between the mold 4*z* and the processed material 2*z* is filled with the imprint material 3*z*. In this state, when the imprint material 3*z* is irradiated with light as energy for curing via the mold 4*z*, the imprint material 3*z* is cured.

In step SD in FIG. 15, after the imprint material 3*z* is cured, the mold 4*z* is separated from the substrate 1*z*, and the pattern of the cured product of the imprint material 3*z* is formed on the substrate 1*z*. In the pattern of the cured product, the concave portion of the mold corresponds to the convex portion of the cured product, and the convex portion of the mold corresponds to the concave portion of the cured product. That is, the pattern having concave and convex portions of the mold 4*z* is transferred to the imprint material 3*z*.

In step SE in FIG. 15, when etching is performed using the pattern of the cured product as an etching resistant mask, a portion of the surface of the processed material 2*z* where the cured product does not exist or remains thin is removed to form a groove 5*z*. In step SF in FIG. 15, when the pattern of the cured product is removed, an article with the grooves 5*z* formed in the surface of the processed material 2*z* can be obtained. Here, the pattern of the cured product is removed. However, instead of removing the pattern of the cured product after the process, it may be used as, for example, an interlayer dielectric film included in a semiconductor element or the like, that is, a constituent member of an article.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-102867, filed Jun. 27, 2022, which is hereby incorporated by reference herein in its entirety.

What is claimed is:

1. An evaluation apparatus configured to perform, concerning a substrate that has undergone a film forming process of forming a film of a composition on a film forming region of the substrate using a mold, evaluation of the film, the apparatus comprising:

a processor configured to:

obtain an image of an evaluation region including the film forming region on which the film is formed by the film forming process;

process the image for the evaluation of the film;

output a feature concerning an abnormality in the image in accordance with a learned model, the feature including a size and a shape of the abnormality; and input the image and design information representing a geometrical feature of the film forming region to the learned model, the design information including at least information of:

a boundary position of the film forming region; and a position and a shape of a mark portion in the film forming region.

2. The apparatus according to claim 1, wherein the learned model is obtained by machine learning for a relationship between the image of the evaluation region including the film forming region and the design information of the film forming region, which are inputs, and the feature concerning the abnormality, which is an output.

3. The apparatus according to claim 1, further comprising a machine learning unit configured to generate the learned model by machine learning.

4. The apparatus according to claim 3, wherein the machine learning unit performs the machine learning for a relationship between the image of the evaluation region including the film forming region and the design information of the film forming region, which are inputs, and the feature concerning the abnormality, which is an output.

5. The apparatus according to claim 1, wherein the learned model calculates a likelihood representing reliability of the detected abnormality.

6. The apparatus according to claim 5, wherein the feature concerning the abnormality further includes information of a type and the likelihood of the abnormality in the image.

7. The apparatus according to claim 6, wherein the type of the abnormality includes extrusion of the composition from the film forming region and unfilling of the composition in the film forming region.

8. The apparatus according to claim 1, wherein the design information is represented in a form of an image.

9. The apparatus according to claim 1, wherein the film forming process is an imprint process of bringing an imprint material that is the composition supplied onto the film forming region and a pattern portion of the mold into contact with each other and transferring a pattern of the mold to the imprint material.

10. The apparatus according to claim 1, wherein the film forming process is a planarization process of bringing the composition supplied onto the film forming region and a flat surface of the mold into contact with each other, thereby forming a planarization film by the composition on the substrate.

11. A film forming system comprising:

a film forming apparatus configured to perform a film forming process of forming a film of a composition on a substrate using a mold; and the evaluation apparatus according to claim 1.

12. An article manufacturing method comprising:

forming a film on a substrate by the film forming apparatus in the film forming system according to claim 11; and processing the substrate with the film formed thereon to manufacture an article.

13. The apparatus according to claim 1, wherein the design information includes information representing a geometrical feature of the film correctly formed.

14. A non-transitory computer-readable storage medium storing a program executable by a computer to execute an evaluation method of evaluating a film of a composition on a film forming region of a substrate using a mold, the film being formed by a film forming process, the method comprising:

obtaining an image of an evaluation region including the film forming region on which the film is formed by the film forming process;

inputting the image and design information representing a geometrical feature of the film forming region to a learned model, the design information including:

a boundary position of the film forming region; and a position and a shape of a mark portion in the film forming region; and processing the image for the evaluation of the film, including outputting a feature concerning an abnormality in the image in accordance with the learned model, the feature including a size and a shape of the abnormality.

15. An information processing apparatus comprising:

a processor configured to:

concerning a substrate that has undergone a film forming process of forming a film of a composition on a film forming region of the substrate using a mold, obtain an image of an evaluation region including the film forming region and design information representing a geometrical feature of the film forming region, the design information including:

a boundary position of the film forming region; and a position and a shape of a mark portion in the film forming region; and perform machine learning on a relationship between the image, the design information, and a feature concerning an abnormality in the image, to generate a learned model, the feature including a size and a shape of the abnormality.

16. A non-transitory computer-readable storage medium storing a program executable by a computer to execute a method comprising:

concerning a substrate that has undergone a film forming process of forming a film of a composition on a film forming region of the substrate using a mold, obtaining an image of an evaluation region including the film forming region and design information representing a geometrical feature of the film forming region, the design information including:

a boundary position of the film forming region; and a position and a shape of a mark portion in the film forming region; and performing machine learning on a relationship between the image, the design information, and a feature concerning an abnormality in the image, to generate a learned model, the feature including a size and a shape of the abnormality.

* * * * *